April 19, 1966     C. O. SLEMMONS     3,246,443

FOAM CUSHION MATERIAL PACKAGING

Filed Sept. 7, 1961

INVENTOR
CHARLES OLIVER SLEMMONS

BY *Kenor, Palmer, Stewart & Estabrook*

ATTORNEYS

United States Patent Office 3,246,443
Patented Apr. 19, 1966

---

3,246,443
FOAM CUSHION MATERIAL PACKAGING
Charles Oliver Slemmons, Akron, Ohio, assignor to The General Tire & Rubber Company, a corporation of Ohio
Filed Sept. 7, 1961, Ser. No. 136,475
5 Claims. (Cl. 53—24)

This invention relates to foam cushion material packaging. More particularly, it relates to an improved method of packaging compressible foam materials such as polyurethane, foam rubber, diene copolymers such as butadiene-styrene copolymers and the like, as well as other foam materials having similar characteristics and further, it concerns a new and unique foam material package.

During recent years, foam materials of the type aforementioned have met with an ever-increasing demand by furniture manufacturers and other industries for use as cushioning elements and the like. Due to the relatively large ratio of volume to weight of these materials, however, most commercial carriers have modified their freight rates so that their shipping charge is currently on a volume basis rather than a weight basis for these materials. This factor, along with the remoteness of points of use from the location of suppliers, has resulted in considerable shipping expenses, thereby increasing costs to the consumer. Suppliers of foam cushioning materials have, therefore, attempted to solve this problem by packaging the foam material in a compressed state to reduce the volume thereof prior to shipment so that on arrival at the point of use, the foam cushion material is removed from the package and permitted to restore itself to its initial, expanded condition. The techniques heretofore employed for this purpose, however, have resulted in either heavy and cumbersome packages because of the wrapping material strength required to retain the foam material in its compressed state against the self-restoring forces extended thereby or have involved such complicated and expensive procedures in achieving the compressed, compacted package that the savings in shipping rates are off-set somewhat by the costs incurred in reducing the volume of the material. Also, upon arrival at the points of use, the packages employed prior to this invention have involved additional waste and increased costs first, because the material within which the foam material is packaged has no further utility to the user of the foam and accordingly, must be disposed of. Secondly, the time and labor required to remove the foam cushioning material from the packages have, in the past, been substantial.

A principal object of this invention, therefore, is to provide an improved method of packaging compressible foam cushioning material as well as to provide a new and unique foam cushion package by which the aforementioned problems are substantially and effectively overcome.

Another object of this invention is the provision of a greatly simplified and thus inexpensive method of packaging foam cushioning material which results in a package of substantially reduced volume as compared with the volume of the foam material in its normal or expanded state and yet which requires a minimum of equipment and materials.

A further object of this invention is to provide a new and improved method of packaging foam cushioning material by which atmospheric pressure may be advantageously used at least in part to retain the foam material in a compressed state and thus at reduced volume thereby substantially reducing the strength of packaging material necessary to retain the material in a compressed condition.

Another object of this invention is the provision of a new and unique foam package by which a cushion of foam material may be effectively retained at a substantially reduced volume and in addition, which facilitates the easy removal of the foam cushion therefrom.

A still further object of this invention is the provision of a foam material package by which foam material is effectively and economically contained in a compressed state within a hermetically sealed covering and releasable therefrom under its own self-contained recovery force merely by puncturing the covering.

Other objects and further scope of applicability of the present invention will become apparent from the detailed description given hereinafter. It should be understood, however, that the detailed description, while indicating a preferred form of the invention, is given by way of illustration only, since it will become apparent to those skilled in the art from this description, that various changes and modifications can be made without departing from the true spirit and scope of this invention.

In general, the aforementioned objects may be accomplished by placing a cushion of foam material between a pair of sheets of heat sealable, air impervious material and compressing the assembly until the cushion assumes a volume approximating 30 percent of the original volume with the result that a substantial amount of air is expelled from the cushion. While so compressed, the sheets are hermetically sealed about the cushion to prevent the re-entry of air into the foam material. As a result, the cushion is retained at the substantially reduced volume under the combined effects of the mechanical covering thus formed and atmospheric pressure since absence of air in the foam retards self-restoration thereof to its normal volume.

A more complete understanding of the method of packaging foam material and the resulting package of this invention will be understood by reference to the accompanying drawings in which.

Figure 1:
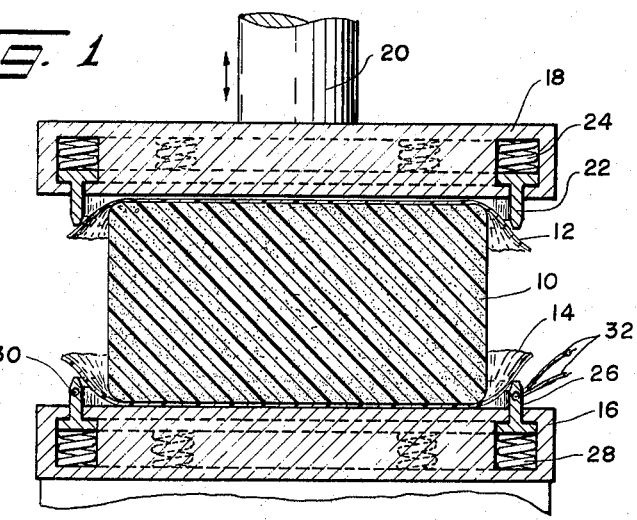
FIG. 1 is a fragmentary cross-sectional view in elevation illustrating one form of apparatus for carrying out the method of the present invention prior to the compression step thereof.

As shown in FIGURE 1 of the drawings, a cushion of foam material designated by the numeral 10 is positioned between a pair of flexible sheets 12 and 14 of air impervious material to define a sandwich in which the edges of the sheets 12 and 14 extend laterally beyond the cushion 10. The foam material from which the cushion 10 is formed may be any of the well known compressible, self-restoring foams such as, for example, polyurethane, foam rubber, diene copolymers such as butadiene-styrene copolymers and the like while the sheets 12 and 14 are preferably formed from a thermoplastic, air impervious material such as polyethylene, poly vinyl chloride, vinyl-diene chloride and the like. It is essential to the present invention, however, only that the specific material chosen for the sheets 12 and 14 is capable of hermetic sealing. Desirably, the sheets may be formed from material which is useful to the recipient of the foam material to keep to a minimum, the overall waste of material required to ship the foam material from the supplier to the user thereof.

The sandwich thus formed by the cushion 10 and the sheets 12 and 14 is placed in a suitable press such as the one illustrated in the drawing having a bed 16, a movable platen 18 capable of reciprocating movement by suitable source of power (not shown) acting on a rod or column 20. The platen 18 is provided with a depending movable rail 22 biased to a downward position by a plurality of helical compression springs 24 and similarly, the bed 16 is provided with an upstanding rail 26 biased by springs 28 upwardly to the position shown in FIGURE 1. The rail 26 is provided with a heating element 30 to which electric current is supplied through leads 32 in a manner well known in the art.

Figure 2:
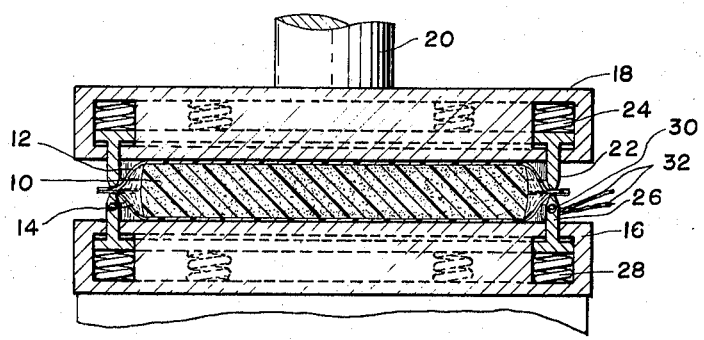
FIG. 2 is a fragmentary cross-sectional view illustrating the sealing stage of the method of this invention.

After so arranging the cushion 10 and the sheets 12 and 14 in the press, the cushion is compressed by moving the platen 18 downwardly toward the bed 16. When the platen has descended sufficiently to compress the cushion the desired amount, the rails 22 and 26 engage and bring into contact the edges of the sheets 12 and 14 around the periphery of the cushion 10 as shown in FIGURE 2 of the drawings. While in this position, the heating element 30 is actuated to heat seal the sheets together thereby hermetically sealing the compressed cushion 10 within the covering formed by the sealed, air impervious sheets 12 and 14. Although the use of thermoplastic material for the sheets 12 and 14 is desirable because of the ease with which these materials may be hermetically sealed in this manner, it is contemplated that other air impervious materials may be used with any suitable joining means.

The amount of compression and thus reduction in volume may vary with different materials and different slab sizes or configurations, but it is preferred that the volume of the cushion 10 is reduced approximately 70 percent; or, in other words, the volume of the compressed cushion is approximately 30 percent of the initial or normal volume of the cushion as shown in FIGURE 1. Since in the sealing step, the sheets 12 and 14 are not pulled tightly about the compressed cushion, upon return of the platen 18 to its initial, lifted position, the cushion expands slightly to take up the slack in the sealed sheets with the result that the completed package assumes a volume approximately one-third of the original volume of the cushion. It is to be noted, however, that the tensile strength of the covering formed by the sheets 12 and 14 provides only a portion of the force necessary to contain the cushion in its compressed state. This result obtains because air, expelled from the cells of the foam cushion during the compression step, is prevented from return thereto by the hermetic seal of the sheets 12 and 14. Accordingly, atmopheric pressure acts against the sealed package to prevent restoration of the cushion to its original expanded volume. The strength and thus the weight of the covering effected by the sealed sheets, therefore, are kept to a minimum.

Figure 3:
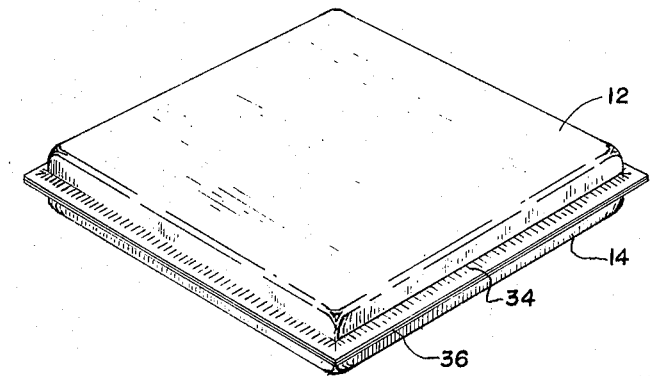
FIG. 3 is a perspective view illustrating the completed foam package of this invention.

The package formed by the above-described method, as shown in FIGURE 3 of the drawings, includes the compressed cushion between the sheets 12 and 14, joined along a seal line 34 and extending as a flange 36. Since as aforementioned, the package occupies approximately one-third the volume of the cushion in its normal expanded state, stowage thereof in a shipping compartment or the like is greatly facilitated. Upon arrival to the point of use, the covering may be merely punctured to permit the entrance of air into the foam material and allow the compressed cushion to restore itself to its original or expanded state. Because atmospheric pressure is largely relied on to keep the cushion 10 from self-restoration to its normal or expanded volume, the sheets 12 and 14 may be selected so as to possess insufficient strength alone to hold the compressed cushion against expansion. Thus, a mere rupture of the covering is all that is necessary to permit the cushion to restore itself to its expanded condition. This feature renders the package of the present invention particularly useful not only to conserve space during the shipment of foam materials but also to provide cushioning in the packaging of other articles for shipment. For example, after an article has been placed in a box or crate or other suitable container, a package formed in accordance with this invention may be inserted between the article and the walls of the receptacle. Thereafter, the covering of the package need merely be ruptured to allow the foam material to exert its recovery force and hold the article firmly in place within the receptacle. This feature is particularly desirable since the foam material may be expanded in this manner after the receptacle has been substantially closed about the article.

Thus, it will be seen that by this invention the aforementioned objects are completely and effectively fulfilled. The method of this invention not only effects a substantial reduction in volume of foam cushions or slabs prior to shipment but does so in a manner so as to increase the weight of the material an insubstantial amount and in a manner such that very little additional space is required for the material covering the compressed foam material. Also, as has been demonstrated above, the resutling package is unique and finds utility not only in the shipment of foam material but also in the shipment of other articles when used as packaged article cushioning.

Since other forms of the invention will be apparent to those skilled in the art, it is to be distinctly understood that the foregoing description is illustrative only and not limiting and that the true spirit and scope of the present invention is to be determined by the appended claims.

I claim:

1. A method of packaging a self-restoring compressible, foam cushion comprising the steps of: positioning the cushion between sheets of air impervious material to form a sandwich with the edges of said sheets extending laterally of the cushion; compressing said sandwich to reduce the volume of the cushion approximately 70 percent and to expel air from the cushion; and heat sealing the edge portions of said sheets about the cushion to effect a hermetic seal between said sheets.

2. The method defined by claim 1 in which said sheets are of thermoplastic material.

3. The method of packaging slabs of compressible foam material which comprises:
   (a) positioning compressible foam cushion between rial between sheets of air-impervious material, which sheets extend at their edges beyond the ends of said slab,
   (b) compressing said slab between said sheets by forcing the sheets toward one another until the volume of said slab is substantially reduced, and
   (c) hermetically sealing said sheets together at their edges about the compressed slab to form a sealed enclosure around said slab having an internal volume equal to said substantially reduced volume of said slab.

4. A method as defined in claim 3 in which said substantially reduced volume of said slab is approximately thitry percent of the original volume of the slab.

5. The method of packaging compressible foam cushion which comprises:
   (a) positioning compressible foam cushion between a pair of sheets of thermoplastic air-impervious film, which sheets extend at their edges a short distance beyond the ends of said cushion,
   (b) compressing said cushion between said sheets by forcing the sheets toward one another between press platens until the volume of said cushion is substantially reduced and said sheet edges come in contact around the entire periphery of said cushion, and (c) heat sealing the thermoplastic sheets together at their contacting edges to form a hermetically sealed enclosure around said cushion having an internal volume equal to said substantially reduced volume of said cushion.

References Cited by the Examiner

UNITED STATES PATENTS

| | | | |
|---|---|---|---|
| 2,516,124 | 7/1950 | Kishibay | 206—46 |
| 2,613,862 | 10/1952 | Vaughn | 53—21 X |
| 2,764,283 | 9/1956 | Stanton | 53—33 X |
| 2,764,859 | 10/1956 | Hanselmann. | |
| 2,921,423 | 1/1960 | Cover | 53—124 |
| 2,971,640 | 2/1961 | Snelling | 206—46 |
| 3,006,119 | 10/1961 | Fingerhut | 53—124 |

FRANK E. BAILEY, *Primary Examiner.*

EARLE DRUMMOND, ROBERT A. LEIGHEY,
*Examiners.*